United States Patent
Petit et al.

(10) Patent No.: US 8,172,272 B2
(45) Date of Patent: May 8, 2012

(54) AIRCRAFT FUEL PIPE COUPLING

(75) Inventors: David Petit, Bristol (GB); Anthony John Bryant, Bristol (GB)

(73) Assignee: Airbus Operations Limited, Bristol (GB)

( * ) Notice: Subject to any disclaimer, the term of this patent is extended or adjusted under 35 U.S.C. 154(b) by 362 days.

(21) Appl. No.: 11/992,947

(22) PCT Filed: Oct. 6, 2006

(86) PCT No.: PCT/GB2006/003744
§ 371 (c)(1),
(2), (4) Date: Apr. 1, 2008

(87) PCT Pub. No.: WO2007/057629
PCT Pub. Date: May 24, 2007

(65) Prior Publication Data
US 2009/0256352 A1    Oct. 15, 2009

(30) Foreign Application Priority Data
Nov. 18, 2005   (GB) .................................. 0523573.4

(51) Int. Cl.
*F16L 27/12* (2006.01)
*F16L 39/04* (2006.01)

(52) U.S. Cl. ........... 285/145.2; 285/123.12; 285/123.15; 285/302

(58) Field of Classification Search .................... 285/13, 285/14, 121.2, 123.1, 123.3, 123.12, 123.15, 285/123.17, 145.1, 145.2, 145.4, 148.3, 302, 285/331
See application file for complete search history.

(56) References Cited

U.S. PATENT DOCUMENTS

| | | | |
|---|---|---|---|
| 1,217,543 A * | 2/1917 | White | 285/123.15 |
| 3,186,739 A | 6/1965 | Mahoff et al. | |
| 3,913,949 A * | 10/1975 | Senatro | 285/14 |
| 4,445,332 A * | 5/1984 | Thies et al. | 60/455 |
| 4,708,371 A | 11/1987 | Elsworth et al. | |

(Continued)

FOREIGN PATENT DOCUMENTS

DE        86 31 085        6/1987

(Continued)

OTHER PUBLICATIONS

International Search Report for PCT/GB2006/003744, mailed Jan. 19, 2007.

(Continued)

*Primary Examiner* — James Hewitt
(74) *Attorney, Agent, or Firm* — Nixon & Vanderhye P.C.

(57) ABSTRACT

A coupling for fuel pipe includes a pipe end fitting, which includes a male outer surface including a groove and a female inner surface including a groove. The coupling includes a double-walled socket including a female outer socket and a male inner shaft. The pipe end fitting is accommodated in the region between the female outer socket and the male inner shaft. A first seal ring seals between the female inner surface and the male inner shaft. A second seal ring, which may be substantially coplanar with the first, seals between the male outer surface and the female outer socket of the double-walled socket. The coupling may be so arranged that the pipe end fitting and the double-walled socket are able to pivot relative to each other by up to at least ±2 degrees and are able to slide both towards and apart from each other.

13 Claims, 10 Drawing Sheets

U.S. PATENT DOCUMENTS

| | | | |
|---|---|---|---|
| 4,850,616 A | | 7/1989 | Pava |
| 4,854,615 A | * | 8/1989 | Smith, III ..................... 285/331 |
| 5,011,193 A | | 4/1991 | Porte |
| 6,056,329 A | * | 5/2000 | Kitani et al. ............... 285/145.3 |
| 6,848,720 B2 | * | 2/2005 | Carns et al. ............. 285/123.15 |
| 7,392,840 B2 | * | 7/2008 | Griffith et al. ............... 166/88.1 |
| 7,717,473 B1 | * | 5/2010 | Zhang et al. ................ 285/121.7 |
| 2003/0217778 A1 | | 11/2003 | Challender |
| 2004/0026922 A1 | * | 2/2004 | Carns et al. ............. 285/123.15 |
| 2004/0078956 A1 | | 4/2004 | Takasaki et al. |
| 2004/0207197 A1 | * | 10/2004 | Hoang et al. ............. 285/123.15 |
| 2009/0091126 A1 | * | 4/2009 | Carns et al. ............. 285/123.15 |
| 2009/0102187 A1 | * | 4/2009 | Carns et al. ............. 285/123.15 |

FOREIGN PATENT DOCUMENTS

| | | |
|---|---|---|
| FR | 2 639 702 | 6/1990 |

OTHER PUBLICATIONS

Great Britain Search Report for Appln. No. 0523573.4 dated Feb. 15, 2006.

* cited by examiner

AIRCRAFT FUEL PIPE COUPLING

This application is the U.S. national phase of International Application No. PCT/GB2006/003744, filed 6 Oct. 2006, which designated the U.S. and claims priority to Great Britain Application No. 0523573.4, filed 18 Nov. 2005, the entire contents of each of which are hereby incorporated by reference.

BACKGROUND OF THE INVENTION

1. Field of the Invention

The present invention relates to aircraft fuel pipe couplings and in particular but not exclusively flexible pipe couplings for connecting a double-walled pipe in an aircraft fuel system to another fuel pipe.

2. Discussion of Prior Art

In aircraft fuel systems it is often necessary to use double-walled pipes, connectors and couplings in order to protect from fuel leakage. When the risk of leakage is high, for example in the pressurised fuselage of an aircraft, the entire fuel system may be double-walled. Where the risk of leakage is less, it may only be the couplings that are double-walled. Further complications arise from the need to use flexible couplings in order to compensate for manufacturing tolerances, structural deflections or thermal effects.

Figure 1:
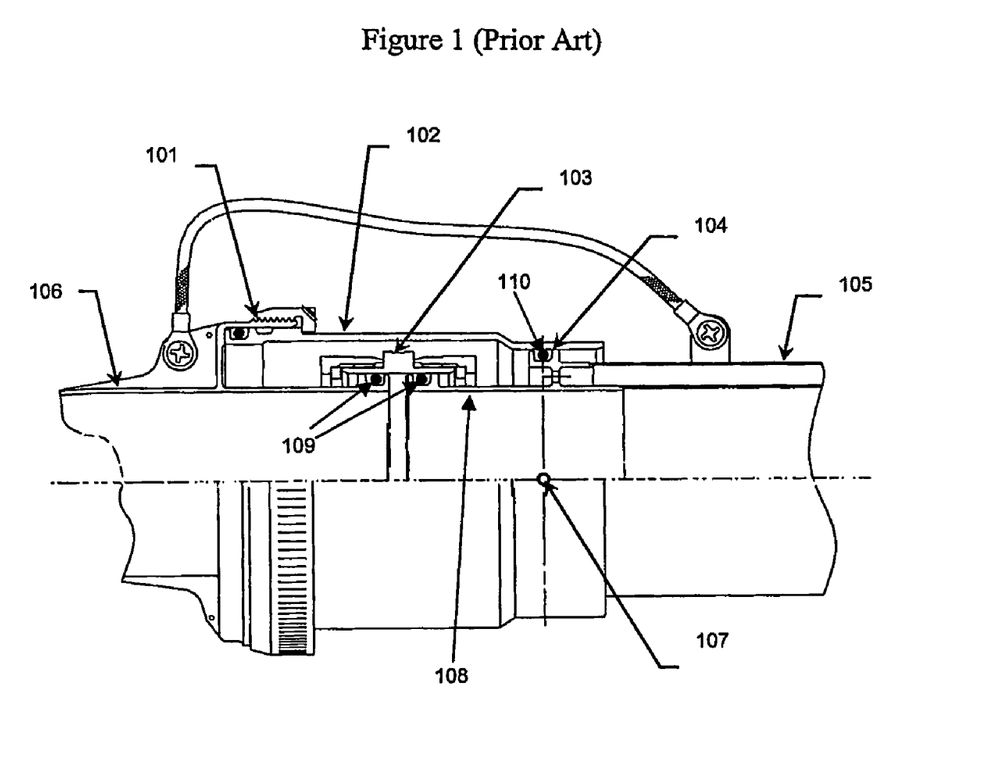
FIG. 1 shows a coupling of the prior art.

FIG. 1 of the attached drawings shows a prior art coupling connecting a single-walled pipe (not shown, but positioned to the left of the coupling as shown in FIG. 1) and a double-walled pipe 105 (to the right of the coupling as shown in FIG. 1). The coupling comprises (a) a rigid coupling part 101 and (b) a flexible coupling part 108. The rigid coupling part 101 is rigidly attached to a single-walled pipe by means of a connector 106. The flexible coupling part 108 comprises an inner flexible coupling 103, an outer flexible coupling 104 joined to the double-walled pipe 105 and an outer removable sleeve 102. The double-walled pipe 105 and connector 106 are connected to each other via the inner flexible coupling 103 and are allowed to float relative to each other by means of two O-ring seals 109 of the inner flexible coupling 103. The outer flexible coupling 104 similarly comprises one O-ring seal 110 allowing axial movement between the outer flexible coupling 104 and the outer removable sleeve 102. The movement provided by the seals 109, 110 of the inner and outer flexible couplings 103, 104 have different centres of rotation. This can subject the coupling to side loads that increase seal and coupling wear and can limit the angular deflection allowable between the opposite ends of the coupling, which may for example rotate relative to each other about axis 107. The positioning of the seals 109, 110 also makes the coupling relatively bulky, thereby requiring a relatively large volume in which to fit. The coupling includes a large number of components that create complexity in the manufacturing process. The prior art coupling also requires complex electrical bonding arrangements between the pipes.

SUMMARY OF THE INVENTION

The present invention seeks to mitigate or overcome one or more of the above-identified disadvantages associated with the prior art coupling.

The invention provides a coupling for connecting fuel pipes where at least one of the fuel pipes is double-walled, the coupling comprising a pipe-end fitting, the pipe end fitting including a male outer surface and a female inner surface, a double-walled socket arrangement, the double-walled socket arrangement including a female outer socket and a male inner shaft, the pipe-end fitting being at least partially accommodated in the region between the female outer socket and the male inner shaft, a first seal ring providing a seal between the female inner surface of the pipe end fitting and the male inner shaft of the double-walled socket arrangement, and a second seal ring providing a seal between the male outer surface of the pipe-end fitting and the female outer socket of the double-walled socket arrangement, wherein the coupling is so arranged that the pipe end fitting and the double walled socket arrangement are able to pivot relative to each other.

An embodiment of the invention described below advantageously reduces the number of parts used in the coupling as compared to the prior art coupling of FIG. 1, thereby reducing both the manufacturing cost and the risk of malassembly. An embodiment of the invention described below enables couplings to be produced that are shorter and more compact than the prior art coupling as illustrated by FIG. 1, reducing the weight of the coupling and the volume occupied by the coupling. The coupling of the embodiment furthermore provides improved overall flexibility, in terms of increased ability to accommodate angular deflections, of the coupling, and the side loads on the seals may be reduced. Of course other embodiments of the invention may provide such advantages and some embodiments may only provide some of the advantages mentioned.

The centres of the first and second seal rings are preferably not separated significantly from each other, but need not be coincident. The first and second seal rings may be arranged such that the angle between (a) a first notional line extending from the centre of the second seal ring to a first point on the surface of the second seal ring and (b) a second notional line extending from the centre of the second seal ring to a second point on the outer surface of the first seal ring, the first and second points being chosen such that their separation is minimised, is between 0 and 5 degrees, and more preferably between 0 and 2 degrees.

The first and second seal rings may be arranged such that, in the direction normal to the plane of the first seal, the distance between the centres of the first and second seals is between 0 and 10 mm, and more preferably between 0 and 5 mm.

The first and second seal rings may be arranged to be substantially coplanar. The centres of the first and second seal rings may by coincident. The pipe end fitting and the double-walled socket arrangement may be able to slide relative to each other both towards and apart from each other. The arrangement of the first seal. ring may permit sliding movement of the female inner surface of the pipe end fitting relative to the male inner shaft of the double-walled socket arrangement. The arrangement of the second seal ring may permit sliding movement of the male outer surface of the pipe end fitting relative to the female outer socket of the double-walled socket arrangement.

The pipe end fitting and the double-walled socket arrangement may be able to pivot relative to each other by up to at least +/−2 degrees, or even up to as high as +/−5 degrees.

The double-walled socket arrangement may be defined by a first unitary part. The pipe end fitting may be defined by a second unitary part. The coupling may thereby have fewer parts in comparison to prior art couplings. In certain examples of the present invention, the double-walled socket arrangement may comprise three unitary parts, in the form of a first part that defines the male inner shaft and second and third parts that together define the female outer socket. Such a construction, whilst comprising more parts than necessary, may aid assembly of the coupling during manufacture and/or fitting.

An electrical connection strap may electrically connect the double-walled socket arrangement and the pipe end fitting.

The coupling may include a seal groove in which one of the first and second seal rings is accommodated. The seal groove may have a Gamah profile. The seal groove and seal ring arrangement may be in the form of a Gamah profile. The groove may have a width greater than the diameter of the cross-section of the seal ring. The groove may have a depth less than the diameter of the cross-section of the seal ring. The groove may have a wall defining a surface against which in use the seal ring is urged, the wall diverging outwardly, for example so that the seal ring is urged to expand in diameter when urged against the wall.

The coupling may be provided independently of a pipe. At least one of the double-walled socket arrangement and the pipe end fitting may be connected to a fuel pipe.

The coupling may be connected to the fuel pipe by means of a connection that includes a sleeve. Advantageously, the maximum angle of pivoting between the double-walled socket arrangement and the pipe end fitting depends on the position of the sleeve. The fuel pipe may be a double-walled fuel pipe comprising an inner pipe wall and an outer pipe wall. Where a sleeve is provided, the sleeve may be connected to the outer pipe wall of the double-walled fuel pipe. During construction, the sleeve may be withdrawn to allow room for the inner pipe wall to be welded to the coupling. The sleeve may thereafter be moved to cover the weld so formed. In that position the sleeve may be welded to both the outer pipe wall and the coupling. The outer pipe wall of the double-walled fuel pipe may be welded along its length. In such a case, the provision of a sleeve for the purpose of facilitating the joining of the coupling to a double-walled pipe may be unnecessary.

Preferably at least part of the region between the female outer socket and the male inner shaft of the double-walled socket arrangement is in fluid communication with at least part of the region between the inner pipe wall and the outer pipe wall of the double-walled fuel pipe. The fluid communication between the double-walled socket arrangement and the double-walled pipe may be facilitated by at least one aperture, and preferably a multiplicity of apertures, located between the first and second seal rings. The fluid communication between the double-walled socket arrangement and the double-walled pipe may be facilitated by a ring of holes located between the first and second seal rings.

The coupling may be associated with a local drain port for the drainage of fuel from a region between the female outer socket and the male inner shaft of the double-walled socket arrangement. For example, the coupling may be arranged to connect to an adjacent fitting including such a drain port and may for that purpose be provided with a drainage outlet arranged to connect to a drainage inlet of a drain port of the adjacent fitting. The drain port may therefore be included as a part of the adjacent fitting. The coupling may include a local drain port.

The coupling of the invention may be connected via a double-walled pipe to another coupling of the invention according to any aspect of the invention.

The present invention also provides a fuel system comprising at least one coupling according to the invention as described herein. The present invention further provides an aircraft including such a fuel system.

The present invention yet further provides a kit of parts for constructing a coupling according to the invention described herein, the kit including
a double-walled socket arrangement and
a pipe end fitting. The double-walled socket arrangement and/or the pipe end fitting may incorporate any of the features of the coupling of the present invention mentioned herein. For example, the kit may further include the first and second seal rings.

BRIEF DESCRIPTION OF THE DRAWINGS

Embodiments of the pipe end will now be described, by way of example only, with reference to the accompany drawings of which.

DETAILED DISCUSSION OF EMBODIMENTS

Figures 2, 2A:
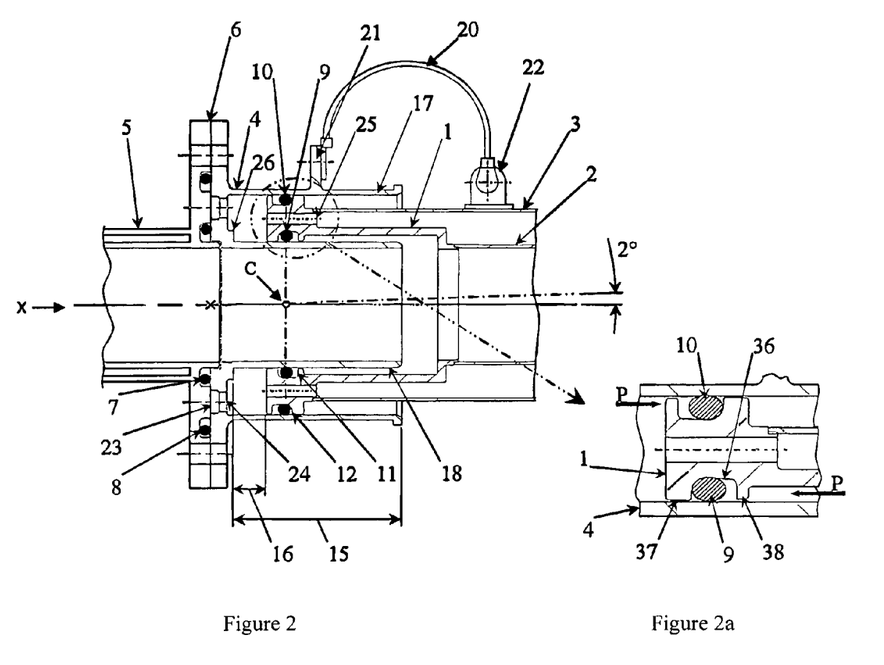
FIG. 2 and 2a show a cross-section of a double-walled pipe coupling according to a first embodiment of the invention.

FIGS. 2 and 2a show a coupling according to a first embodiment of the invention. The coupling is arranged about an axis X and joins a double-walled rigid pipe 5 (on the left in FIG. 2) and a double-walled rigid pipe (on the right in FIG. 2) comprising an inner rigid pipe wall 2 and an outer rigid pipe wall 3. The coupling comprises a unitary end fitting 1 attached by fusion welding to the double-walled pipe 2, 3. The coupling also comprises a unitary double-walled socket 4 attached to the adjacent double-walled pipe 5 by means of a split flange, the split flange comprising a flange on the pipe 5 and a corresponding flange on the double-walled socket 4, the split line indicated by the arrow 6. The pipe 5 in this embodiment is in the form of a double-walled connector pipe including an end flange, which is rigidly attached to the aircraft structure (to the rear spar - not shown). The connection of the double-walled socket 4 and the single-walled pipe 5 is sealed by an inner static 0-ring seal 7 and an outer static 0-ring seal 8. The double-walled socket has an inner wall which defines a male inner shaft 18 and an outer wall which defines a female outer socket 17. The end fitting 1 is partially accommodated in the region between the male inner shaft 18 and the female outer socket 17 of the double-walled socket 4. The bolted split flange is separated by removing the bolts and pushing the double-walled socket 4 axially along the end fitting 1.

The end fitting 1 includes a female inner seal groove 11 defining a part of a female inner surface and a male outer seal groove 12 defining a part of a male outer surface. The end fitting 1 slidingly engages with, and is attached to, the double-walled socket 4 by means of an inner dynamic O-ring seal 9 installed in the female inner seal groove 11 and an outer dynamic O-ring seal 10 installed in the male outer seal groove 12. The female outer socket 17 of the double-walled socket 4 forms the sealing surface that engages with the outer dynamic O-ring seal 10. Similarly, the male inner shaft 18 of the double-walled socket 4 forms the sealing surface that engages with the inner dynamic O-ring seal 9.

The male outer seal groove 12 is based on a well known profile, often referred to as a "Gamah" profile. Further details concerning this sealing arrangement is provided in U.S. Pat. No. 3,186,739. The female inner seal groove 11 is similar to the male outer seal groove 12 but is mirrored and reoriented in relation to the male outer seal groove 12 in order to maintain the correct position of the inner dynamic O-ring seal 9 in the female seal groove 11 when the inner pipe 2 is pressurised and also to ensure the inner and outer dynamic O-ring seals 9, 10 are aligned in the same plane.

As shown in FIG. 2a, due to the differences in pressure direction (P) acting on the inner dynamic O-ring seal 9 and the outer dynamic O-ring seal 10, the thick annular flange 37 on the female inner seal groove 11 is positioned on the opposite side of the seal groove when compared to the male outer seal groove 12. It will be noted that the seal rings 9, 10 lie on the same plane and are centred on the same point (a point on the axis X of the coupling). The geometry of the thick annular flange 37, the thin annular flange 38 and the bottom face 36 of the female inner seal groove 11 is similar to the standard Gamah profile. In relation to the female inner seal groove 11 and the male outer seal groove 12, each groove is defined by a thick flange and a thin flange. The thick flange in each case defines an internal wall of the groove that diverges outwardly with distance from the base of the groove. For example, with reference to FIG. 2a, the inner seal ring 9, when exposed to fluid pressure P, is urged against the thick flange 37 of the groove 11 and is therefore also urged, to a limited extent, away from the base 36 of the groove and against the sealing surface provided by the male inner shaft 18 opposite the groove 11.

The coupling is capable of allowing up to two degrees angular misalignment between pipe centrelines, with combined or separate axial movement. The ability of the coupling to accommodate such angular misalignment is provided by the particular arrangement of the connection between the end fitting 1 and the double-walled socket 4 of the coupling. For example, the substantially coplanar arrangement of the seal rings 9, 10, that provide the flexible sealed connection, allows flexing of the coupling, about a centre C of rotation that is position at the single shared centre of the sealing rings 9, 10. It will of course be appreciated that the end fitting 1 and the double-walled socket 4 may pivot relative to each other about a centre of rotation that is not in the plane of the seal rings 9, 10 and/or which is not on the axis X of the coupling. Of course, the amount of angular displacement feasible between the end fitting 1 and the double-walled socket 4 will reduce with an increase in the distance of the centre of rotation from the optimum centre of rotation (which is thought to be at the centre C of the sealing rings 9, 10). It will also be understood from the foregoing that the centre of pivoting between the end fitting 1 and the double-walled socket 4 need not be fixed.

The maximum axial relative movement between the end fitting 1 and the double-walled socket 4 of the coupling may be dependent upon the socket depth 15 or the coupling gap 16, the coupling gap being the distance, at normal working separation, between the surfaces of the pipe end fitting 1 and the double-walled socket 4 that abut when the end fitting 1 is pushed into the socket 4 as far as it can be. Other constraints such as those caused by couplings at the other end of the double-walled pipe assembly 2, 3, may also affect the amount of axial movement permitted. The small gaps between the end fitting 1 and the double-walled socket 4 have been optimised to prevent extrusion of the inner and outer dynamic O-ring seals at pressures in excess of 250 psi, whilst preventing contact between the end fitting 1 and the double-walled socket 4 at the maximum angular misalignment with worst-case manufacturing tolerances applied.

Figure 5:
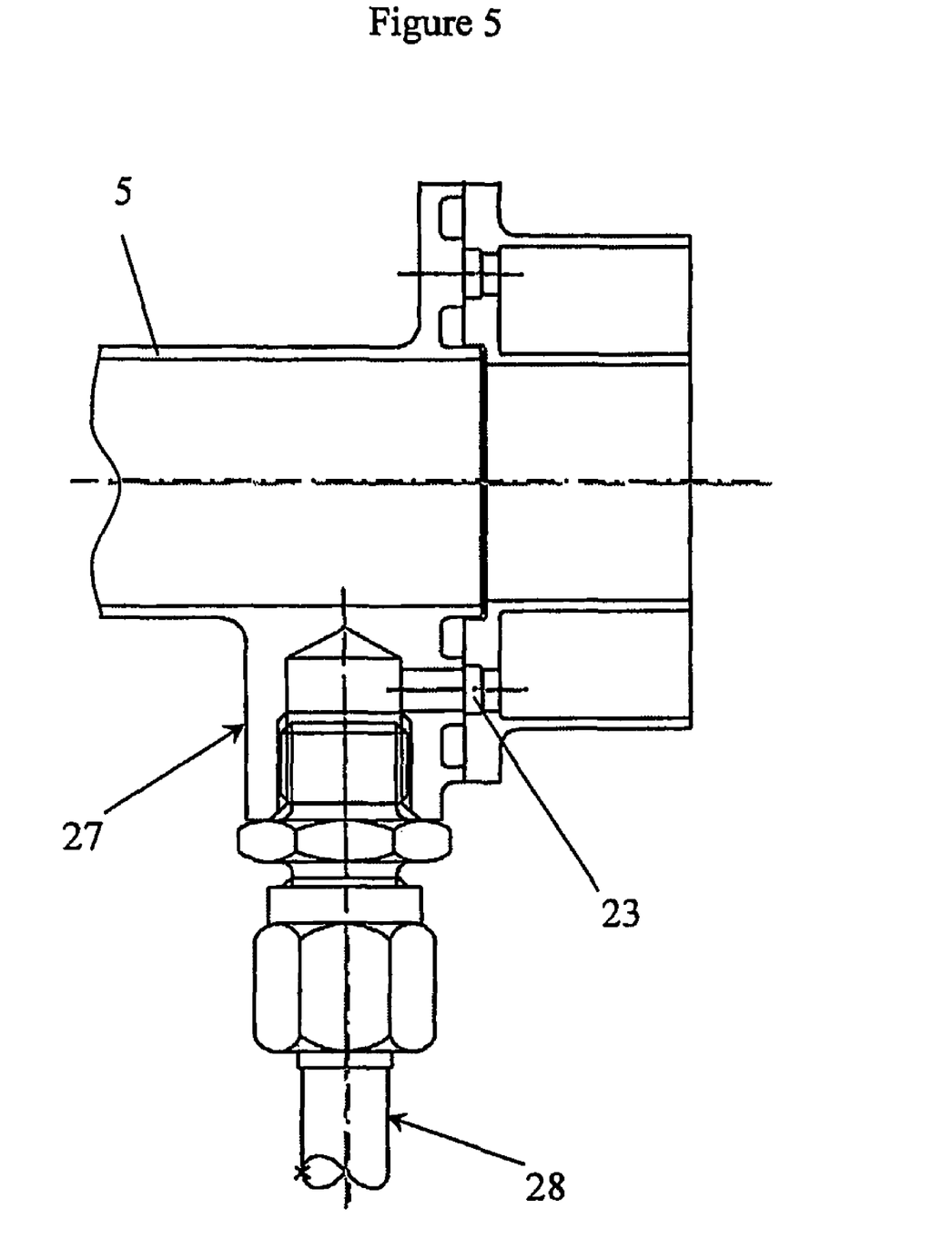
FIG. 5 shows a drain port as present in both the first and second embodiments.

The end fitting 1 and the double-walled socket 4 feature drain holes 24, 25 to permit free drainage of leaking fluid (for example fuel) from the inner pipe 2, inner static O-ring seal 7 or inner dynamic O-ring seal 9 through the coupling and pipe assembly. Fluid leaking from inside the fuel pipe via the inner static O-ring seal 7 is contained by the outer static O-ring seal 8, and may either be collected in a drainage groove 23 and subsequently drained or be transferred to the double socket via drain holes 24 that are positioned in a radial pattern (of 24 holes) in the split flange 6. Leaking fluids that have leaked into the region between the male inner shaft 18 and the female outer socket 17 of the double-walled socket 4 may transfer through drain holes 25 positioned in a radial pattern in the double pipe end fitting 1 and then into the region between the inner and outer pipes 2, 3 of the double-pipe. A step 26 in the back face of the double socket ensures that the drain holes in the end fitting are not covered when the double pipe end fitting 1 is pushed fully into the double socket 4. Any fluid that has leaked into the region between the inner and outer pipes 2, 3 of the double-pipe may drain from the fuel system via a drain port attached to the pipe system in the region of a coupling (there may of course be multiple couplings each associated with such a drain port). FIG. 5 shows the arrangement of the drain port (not shown in FIG. 2) in relation to the coupling and is described in further detail below.

The double-walled pipe assembly 2, 3 is electrically bonded to the double-walled socket 4 at each end by means of an electrical bonding lead 20 attached to an integral bonding lug 21 on the double-walled socket 4 and a bonding tag 22 fusion welded to the double-walled pipe assembly 2, 3. Thus the single-walled pipe 1 is electrically connected to both inner and outer pipe walls 2, 3 of the double-walled pipe assembly 2, 3, thereby providing reliable grounding of the pipes in the fuel system.

Figure 3:
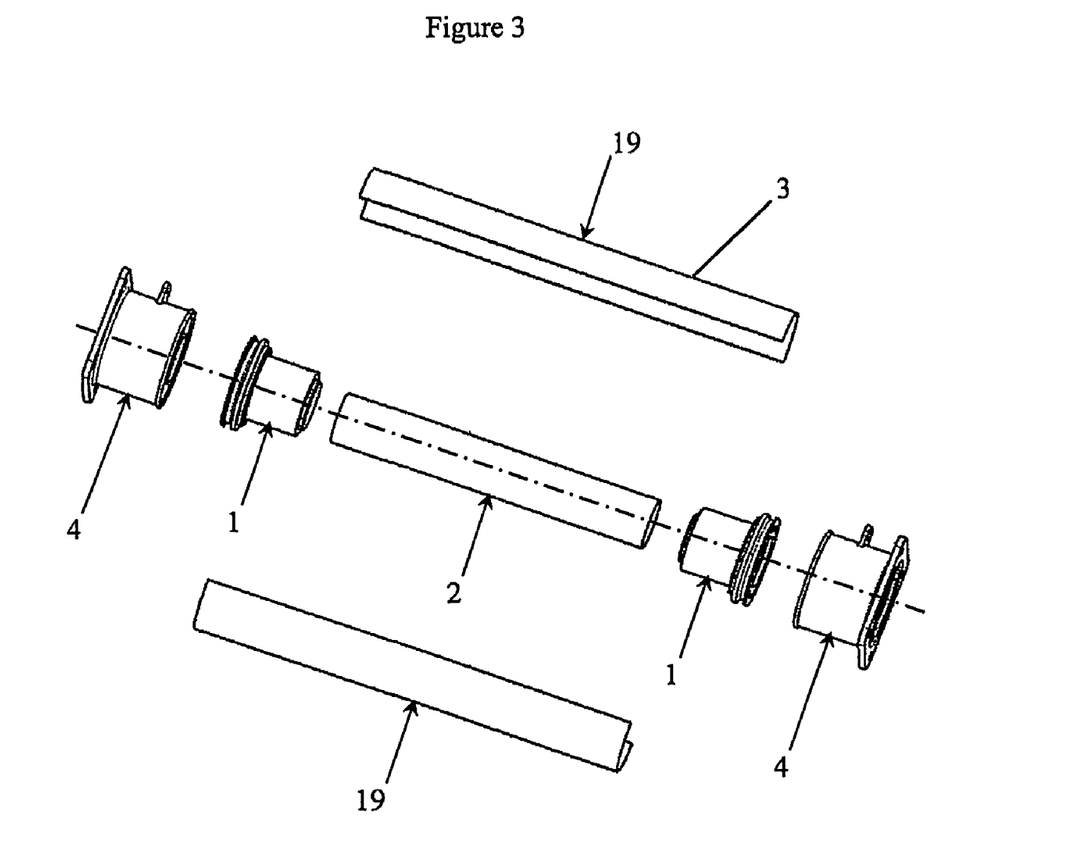
FIG. 3 shows an exploded view of a double-walled pipe assembly of a second embodiment.
Figure 4:
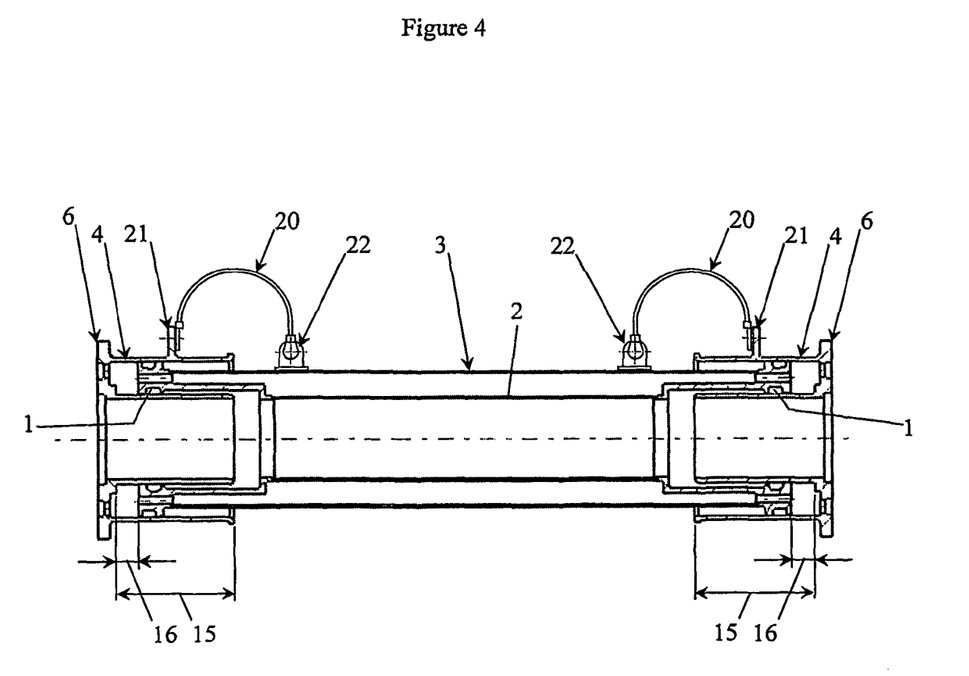
FIG. 4 shows a cross-section of the double-walled pipe assembly of the second embodiment.

FIGS. 3 and 4 show a pipe and coupling assembly according to a second embodiment, which utilises two couplings 1, 4 of the first embodiment fixed at either end of a double-walled pipe assembly comprising inner and outer pipe walls 2, 3. In order to assemble the components that make up the assembly of the second embodiment, the outer pipe wall 3 of the double-walled pipe assembly comprises two identical outer pipe half-pressings 19 (shown as such in the exploded view of FIG. 3). During manufacture of the pipe and coupling assembly of the second embodiment, the end fittings 1 are fusion welded to the inner pipe wall 2, and then the outer pipe wall 3 is formed by welding the half pipes 19 together along their length and to the end fittings 1. The pipe and coupling assembly is then able to be installed in an aircraft, its use typically being such that the double sockets 4 are rigidly fixed relative to fixed structure in the aircraft.

The arrangement of pipe and coupling assembly according to the second embodiment is such that the double-walled pipe assembly 2, 3 is effectively free to float between the two rigidly mounted double sockets 4 and such that prior to installation the length of the pipe and coupling assembly is adjustable The coupling gaps 16 depend on the separation of the two rigidly mounted double-walled sockets 4 and on the shape and configuration of the pipe end fitting 1 and the interior of the double-walled socket 4 (see FIG. 4). The amount of axial movement permitted is equal to the sum of the coupling gaps 16 at each end. The socket depth 15 is selected in dependence on the required amount of axial movement able to be accommodated. The connections between the double sockets 4 at either end of the assembly and the double pipe 2, 3 are also such that pivoting movement of up to about 2 degrees can be accommodated per connection The double-walled pipe assembly 2, 3 may therefore remain engaged in the double sockets 4 under all foreseeable combinations of manufacturing tolerances, structural deflections and thermal effects. The pipe and coupling assembly of the second embodiment may be readily installed and removed from a fuel pipe system in an aircraft simply by unbolting the split flange connection to the adjacent pipes or connectors (for example a double walled pipe 5 as shown in FIG. 2). The amount of axial movement of the double-walled pipe may be determined principally by the axial separation of the two double-walled sockets 4 as installed as compared to the length of the double-walled pipe.

Any fluid that has leaked into the region between the inner and outer pipes 2, 3 of the double-pipe may, in a similar manner to the first embodiment, drain from the fuel system via a drain port. FIG. 5 shows the arrangement of such a drain port 27 attached to the adjacent pipe 5. The drain port 27 receives fluid from the coupling via a drainage hole 23 and provides a pipe connector that allows the drainage port to be connected to a small diameter drainage system pipe 28. Drainage ports are conveniently positioned at the lowest points in the system. The drainage port may lead leaked fuel to an inspection chamber so that leaks may be detected during maintenance of the aircraft.

Figure 6:
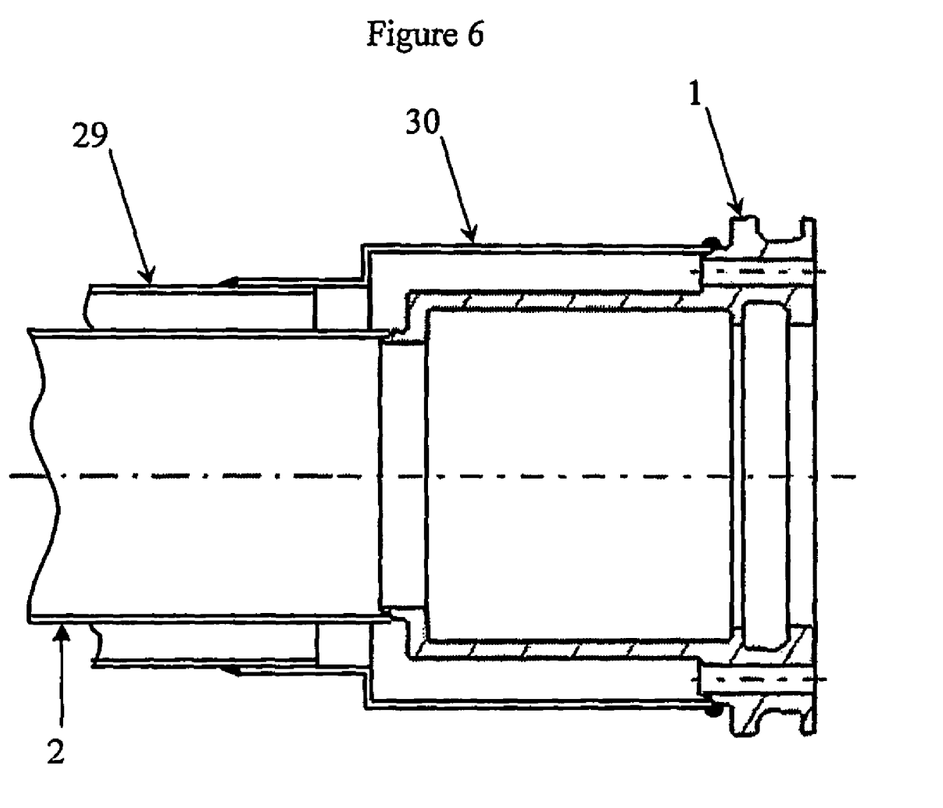
FIG. 6 shows a cross-section of a stepped sleeve of a coupling of a third embodiment.

A third embodiment of the invention, shown in FIG. 6, shows an alternative means of facilitating the assembly of the coupling and a pipe. Whereas in the second embodiment two outer pipe half-pressings 19 are used to form the outer pipe wall 3 of the double pipe assembly which has a length longer than the inner pipe wall 2, the third embodiment utilises a unitary outer pipe 29, which is shorter than the inner pipe wall 2. In order to allow both the inner and outer walls 2, 29 to be welded to the end fitting 1, there is provided a stepped sleeve 30 that is, before the parts are welded together, retractable. During construction of the coupling, the sleeve 30 is retracted by sliding it down the outer pipe 30. The inner pipe wall 2 is then welded to the end fitting 1. The sleeve 30 is then moved by sliding it up the outer pipe 29 so that it abuts the end fitting 1. The sleeve 30 is then welded to both the outer pipe wall 29 and the end fitting 1.

Figure 7:
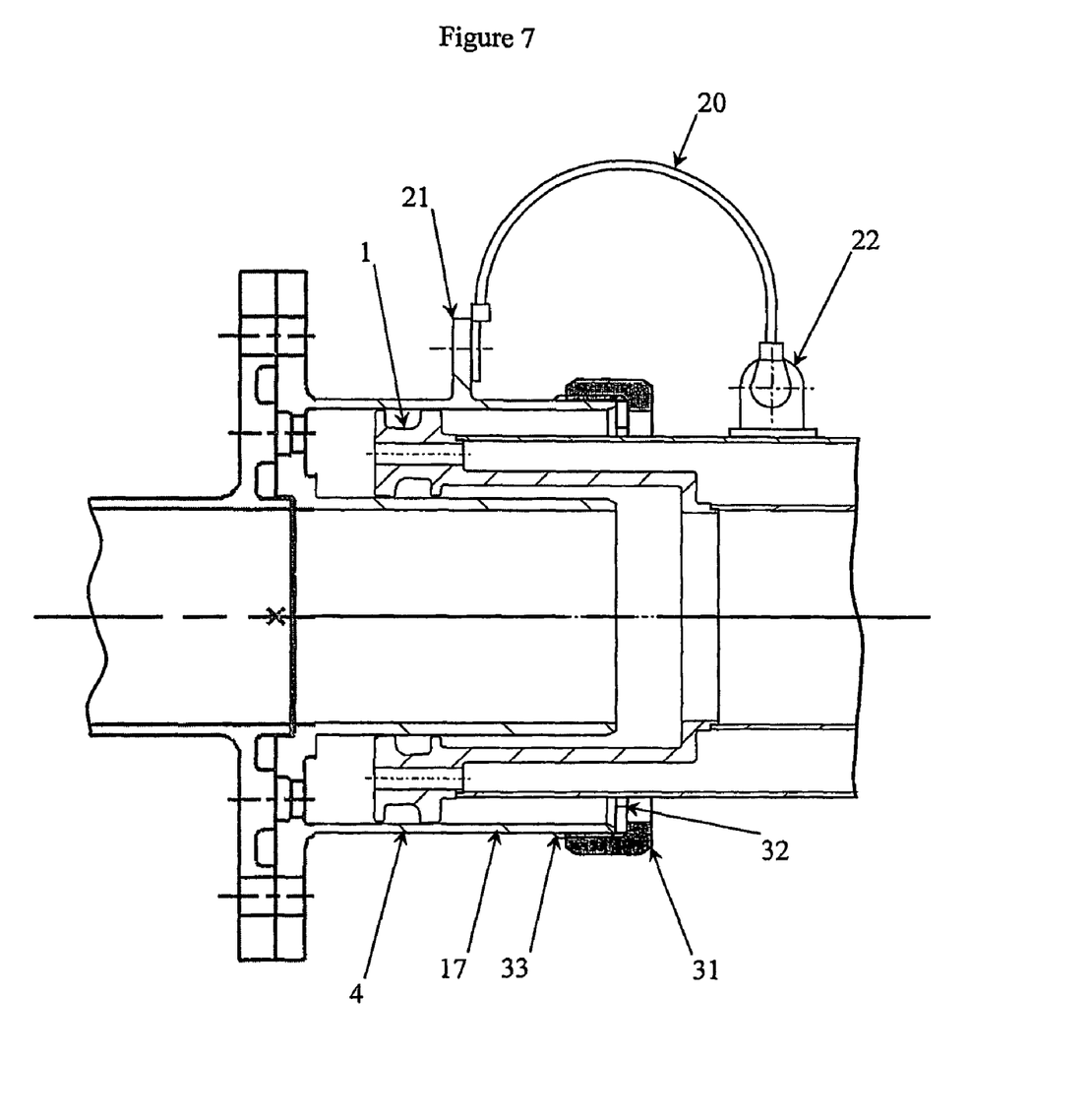
FIG. 7 shows a cross-section of a retained pipe coupling of a fourth embodiment.

FIG. 7 shows a fourth embodiment whereby the double pipe end fitting 1 is retained in the double-walled socket 4 by means of a threaded retaining nut 31 and a split ring 32 fastened to the outer socket 17, which incorporates an external thread 33. The provision of the split ring 32 provides a means for varying the angular deflection allowed between the end fitting 1 and the double-walled socket 4. The dimensions of the split ring 32 may be chosen in accordance with the required angular flexibility of the relative pivoting between the end fitting 1 and the double-walled socket 4. The nut may provide additional fire risk protection.

Figure 8:
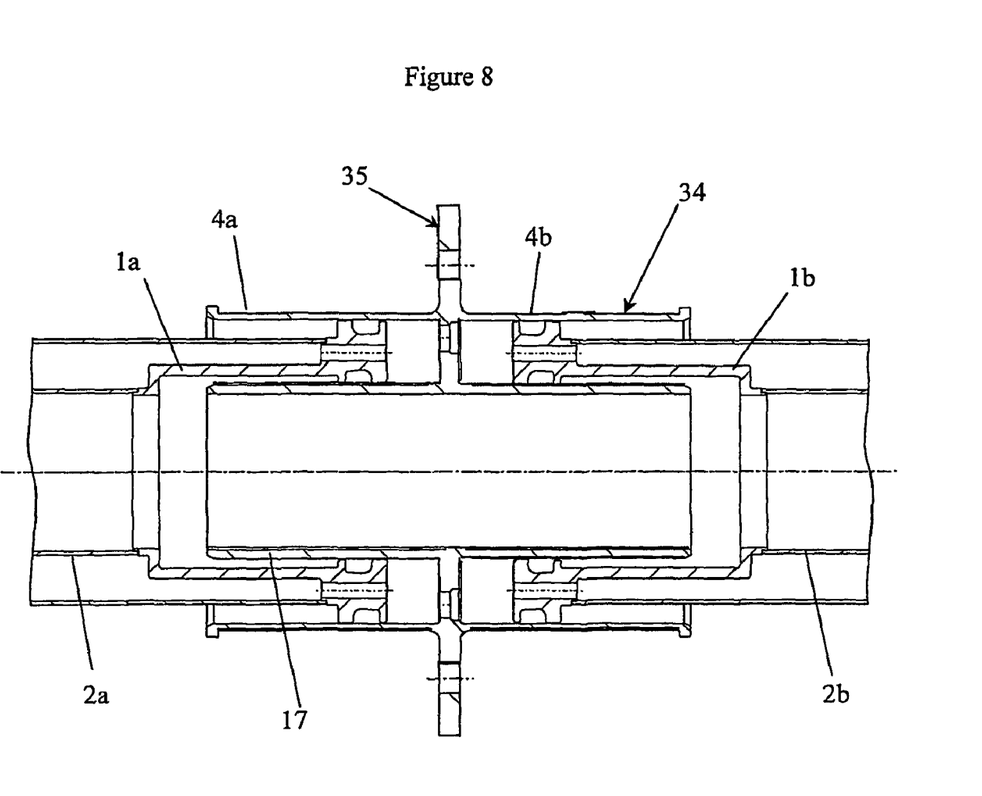
FIG. 8 shows a cross-section of a double-walled coupling of a fifth embodiment connecting double-walled pipes.

FIG. 8 shows a fifth embodiment suitable for application within a continuous double-walled pipe installation, two double sockets 4a, 4b are integrated into a single-piece connector 34 which is rigidly attached to the aircraft structure (not shown) by means of an integral flange 35 with bolt holes therein. Each socket 4a, 4b receives a pipe end fitting 1a, 1b attached to the end of a double-walled pipe assembly. The fuel pipe installation may then comprise successive double-walled pipes, each having end fittings mounted at either end, joined by double-walled couplings 34. Such an installation would provide leak containment for inner pipes 2a, 2b and inner couplings 17.

Figure 9:
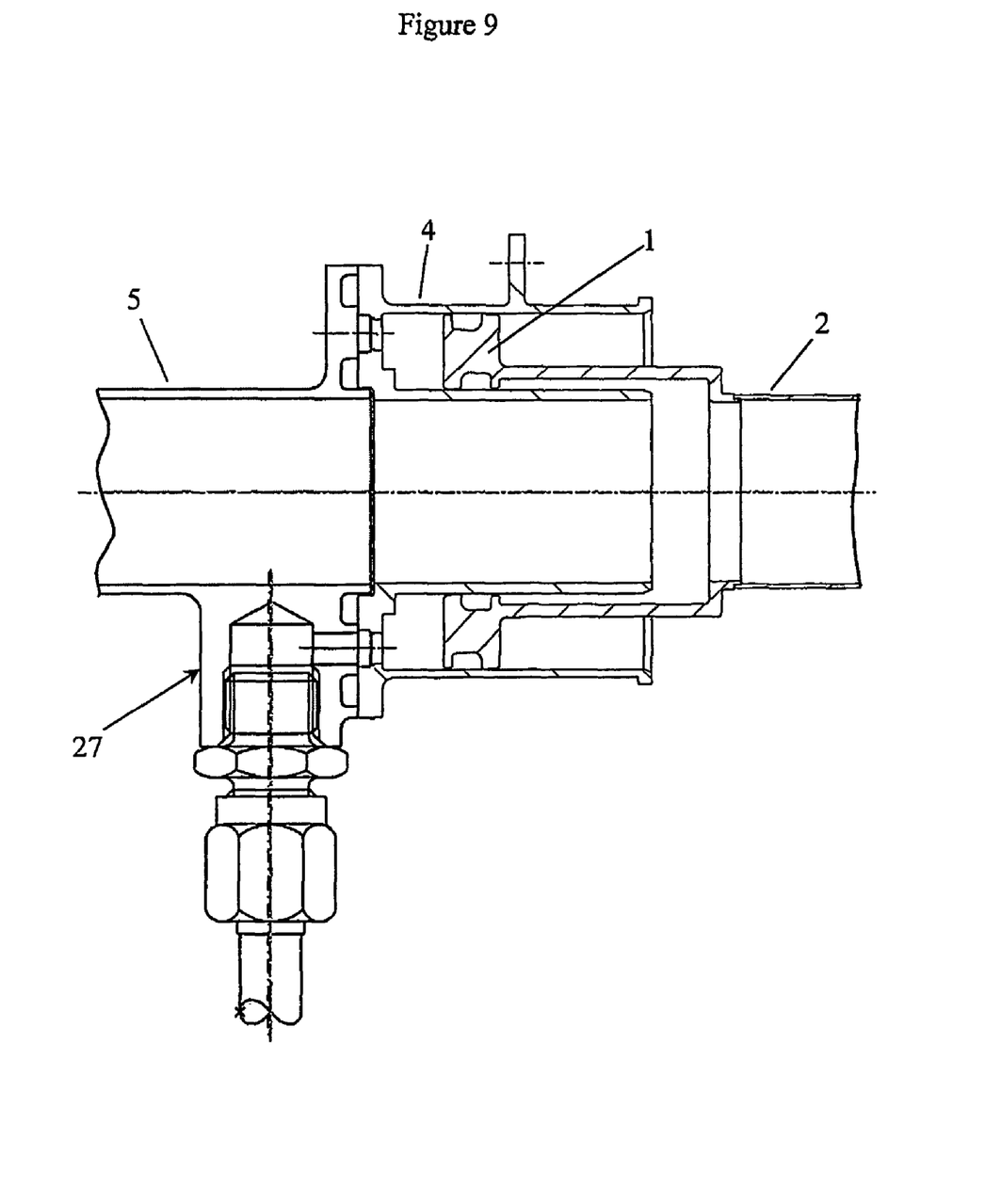
FIG. 9 shows a cross-section of a double-walled coupling of a sixth embodiment connecting single-walled pipes.

FIG. 9 shows an sixth embodiment for an application within a single-walled pipe installation. In this embodiment, in contrast to the first embodiment, only a single walled pipe 2 is connected to the end fitting 1. Therefore, the outer pipe and drain holes in the double pipe end fitting need not be present. The embodiment includes a drain port 27. The pipe installation may then comprise single-walled pipes joined by a double-walled couplings. Of course, such an installation would provide leak containment for inner seals only.

Figure 10:
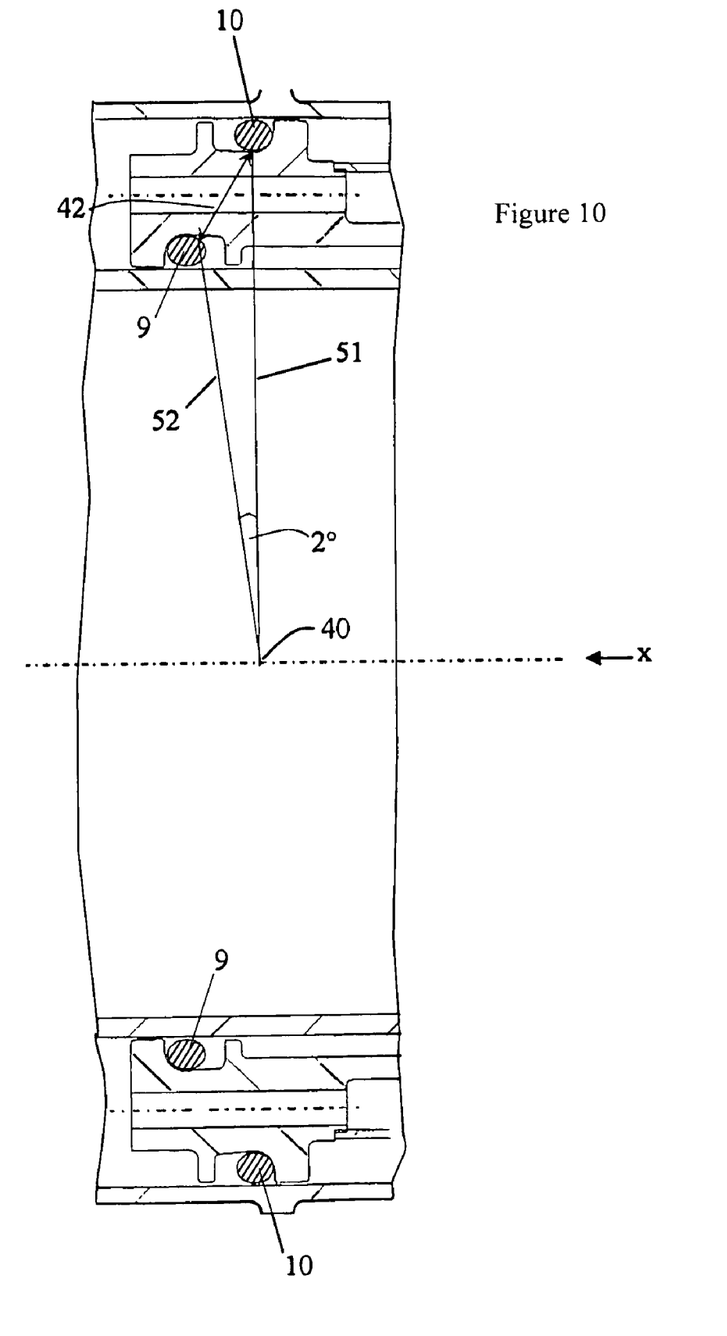
FIG. 10 shows a cross-section of part of a double-walled pipe coupling according to a seventh embodiment of the invention.

FIG. 10 shows a partial cross-sectional view of a seventh embodiment of the invention, that is similar to the first, but differs in that the inner and outer dynamic 0-ring seals 9, 10 are not coplanar as in FIG. 2 but are considered substantially coplanar. Instead the seals are separated from each other by a distance of about 1 mm along the axis X. The outer seal has a diameter of 60 mm. As such, the seals 9, 10 are arranged such that the angle between (a) a first notional line 51 extending from the centre 40 of the outer seal ring 10 to a first point on the surface of the outer seal ring 10 and (b) a second notional line 52 extending from the centre of the second seal ring 10 to a second point on the outer surface of the inner seal ring 9, the first and second points being chosen such that their separation 42 is minimised, is about 2 degrees. If the angle is lower, the separation of the seals along the axis will be lower and the pivoting flexibility of the coupling will be greater.

Whilst the present invention has been described and illustrated with reference to particular embodiments, it will be appreciated by those of ordinary skill in the art that the invention lends itself to many different variations not specifically illustrated herein. For that reason, reference should be made to the claims for determining the true scope of the present invention. By way of example, in a further embodiment (not separately illustrated), the inner pipe 2 and the outer pipe 3 may be manufactured in a non-metallic material such as carbon fibre composite and joined to the double pipe end fitting 1 using adhesive. Also, the drain part described above could form part of the coupling.

The invention claimed is:

1. A coupling for connecting fuel pipes where at least one of the fuel pipes is double-walled, the coupling comprising
a pipe end fitting, the pipe end fitting including a male outer surface and a female inner surface,
a double-walled socket arrangement, the double-walled socket arrangement including a female outer socket and a male inner shaft, the pipe end fitting being at least partially accommodated in the region between the female outer socket and the male inner shaft,
a first seal ring providing a seal between the female inner surface of the pipe end fitting and the male inner shaft of the double-walled socket arrangement, the first seal ring is located within a first seal groove formed in the female inner surface of the pipe end fitting, and
a second seal ring providing a seal between the male outer surface of the pipe end fitting and the female outer socket of the double-walled socket arrangement, the second seal ring is located within a second seal groove formed in the male outer surface of the pipe end fitting, said first and second seal rings configured to be substantially co-planar, wherein
the coupling is configured that the pipe end fitting and the double-walled socket arrangement are pivotable relative to each other and the pipe end fitting and the double-walled socket arrangement are slideable towards and away from each other with the first and second seal rings remaining substantially coplanar.

2. A coupling according to claim 1, wherein the first and second seal rings are arranged such that the angle between (a) a first notional line extending from the center of the second seal ring to a first point on the surface of the second seal ring and (b) a second notional line extending from the center of the second seal ring to a second point on the outer surface of the first seal ring, the first and second points being chosen such that their separation is minimized, is between 0 and 5 degrees.

3. A coupling according to claim 1, wherein the pipe end fitting and the double-walled socket arrangement are able to pivot relative to each other by up to at least +/−2 degrees.

4. A coupling according to claim 1, wherein the double-walled socket arrangement is defined by a first unitary part and the pipe end fitting is defined by a second unitary part.

5. A coupling according to claim 1, wherein one of the first and second seal grooves has a Gamah profile.

6. A coupling according to claim 1, wherein at least one of the double-walled socket arrangement and the pipe end fitting is connected to a double-walled fuel pipe comprising an inner pipe wall and an outer pipe wall.

7. A coupling according to claim 6, wherein the coupling is connected to the fuel pipe by means of a sleeve connected to the outer pipe wall of the double-walled fuel pipe and the maximum angle of pivoting between the double-walled socket arrangement and the pipe end fitting depends on the position of the sleeve.

8. A coupling according to claim 6, wherein at least part of the region between the female outer socket and the male inner shaft of the double-walled socket arrangement is in fluid communication with at least part of the region between the inner pipe wall and the outer pipe wall of the double-walled fuel pipe.

9. A coupling according to claim 8, wherein the fluid communication between the double-walled socket arrangement and the double-walled pipe is facilitated by at least one aperture located between the first and second seal rings.

10. A coupling according to claim 1, wherein the coupling is associated with a local drain port for the drainage of fuel from a region between the female outer socket and the male inner shaft of the double-walled socket arrangement.

11. A coupling according to claim 1, connected via a double-walled pipe to another coupling according to claim 1.

12. An aircraft including a fuel system wherein the fuel system comprises at least one coupling according to claim 1.

13. A coupling for connecting fuel pipes where at least one of the fuel pipes is double-walled, the coupling comprising
a pipe end fitting, the pipe end fitting including a male outer surface and a female inner surface,
a double-walled socket arrangement, the double-walled socket arrangement including a female outer socket and a male inner shaft, the pipe end fitting being at least partially accommodated in the region between the female outer socket and the male inner shaft,
a first seal ring providing a seal between the female inner surface of the pipe end fitting and the male inner shaft of the double-walled socket arrangement, the first seal ring is located within a first seal groove formed in the female inner surface of the pipe end fitting, and
a second seal ring providing a seal between the male outer surface of the pipe end fitting and the female outer socket of the double-walled socket arrangement, the second seal ring is located within a second seal groove formed in the male outer surface of the pipe end fitting, said first and second seal rings configured to be substantially coplanar and the first seal groove and the second seal groove are arranged to move together, wherein the coupling is configured that the pipe end fitting and the double-walled socket arrangement are pivotable relative to each other and the pipe end fitting and the double-walled socket arrangement are slideable towards and away from each other with the first and second seal rings remaining substantially coplanar.

* * * * *